United States Patent [19]

Beele

[11] Patent Number: 5,344,106
[45] Date of Patent: Sep. 6, 1994

[54] FIRE RESISTING CABLE SYSTEM

[75] Inventor: Johannes A. Beele, Opmeer, Netherlands

[73] Assignee: Beele Engineering B.V., Aalten, Netherlands

[21] Appl. No.: 951,966

[22] Filed: Sep. 25, 1992

[30] Foreign Application Priority Data

Sep. 27, 1991 [NL] Netherlands ............ 91.01637

[51] Int. Cl.$^5$ .............................................. H02G 3/22
[52] U.S. Cl. ..................... 248/56; 52/220.8
[58] Field of Search ............... 248/56, 68.1; 285/158, 285/131; 52/232, 220.1, 220.3, 220.8; 174/151, 76, 37

[56] References Cited

U.S. PATENT DOCUMENTS

| | | | |
|---|---|---|---|
| 4,061,344 | 12/1977 | Bradley et al. | 248/56 |
| 4,093,818 | 6/1978 | Thwaites et al. | 248/56 |
| 4,219,173 | 8/1980 | Forbes | 248/56 |
| 4,245,445 | 1/1981 | Heinen | 52/220.8 |
| 4,424,867 | 1/1984 | Mallow | 52/220.8 |
| 4,702,444 | 10/1987 | Beele | 248/56 |
| 4,712,342 | 12/1987 | Legerius et al. | 52/220.8 |

FOREIGN PATENT DOCUMENTS 2627447 12/1977 Fed. Rep. of Germany ......... H02G 3/22
3918892 11/1990 Fed. Rep. of Germany ......... F16L 59/00

Primary Examiner—Richard K. Seidel
Assistant Examiner—Hwei-Siu Payer
Attorney, Agent, or Firm—Pennie & Edmonds

[57] ABSTRACT

A fire resisting system for passing at least one cable, tube or the like through an opening in a wall in a liquid- and gastight manner, the system including fire resisting member, which can at least partially be provided in the opening, and which can at least partially be provided around the cables, tubes or the like to be passed through the opening.

18 Claims, 5 Drawing Sheets

FIRE RESISTING CABLE SYSTEM

FIELD OF THE INVENTION

The invention relates to a fire resisting system for passing at least one cable, tube or the like through an opening in a wall in a liquid- and gastight manner.

The invention furthermore relates to a method for passing at least one cable, tube or the like through an opening in a wall in a liquid- and gastight manner, using said system.

BACKGROUND OF THE INVENTION

A fire resisting system and method as described above are known from U.S. Pat. No. 4,702,444.

A drawback of this known system and this known method is that in order to obtain a reasonable fire resistance, liquid- and gastightness this known system must be mounted on either side of the wall, which not only is costly and laborious, but also requires a certain amount of preengineering. A further drawback is that some of the fire resistance, liquid- and gastightness of the passage of the at east one cable, tube or the like will be lost when—for example in case of a fire—the temperature around the passage runs up, whereby in addition to that sheaths of electric cables or the like will melt.

SUMMARY OF THE INVENTION

The object of the invention is to provide an economical, heat resisting and fire resisting system and a method for passing at least one cable, tube or the like through a wall in a liquid- and gastight manner, also in case of temperatures running high, without there being a possibility of sheaths of, for example, electric cables melting thereby.

In order to accomplish that objective, a system of the kind mentioned in the introduction is according to the invention characterized in that the system includes fire resisting means, which can at least partially be provided in the opening, and which can at least partially be provided around the at least one cable, tube or the like to be passed. This means contains, for example, a fire resisting rubber, which can preferably expand under the influence of heat, so that a sufficient degree of "tightness" in the opening is realized at all times. An additional advantage of this expansion is thereby that a "passage mass" is obtained which is longer and thus better resistant to fire. Furthermore, the fire resisting rubber preferably has a low smoke index, whereby smoke given off by the rubber in the presence of fire is non-toxic.

One embodiment of a system according to the invention, wherein said system is provided with a frame which can be sealingly provided in the opening in the wall, is characterized in that the fire resisting means can be provided at least partially within the frame, at least partially around the at least one cable, tube or the like to be passed.

Another embodiment of a system according to the invention is characterized in that the fire resisting means is substantially formed in the shape of a sleeve to be provided around the cable, tube or the like to be passed. Such sleeves preferably have a continuous slot, so that the sleeves can easily be provided around cables, tubes or the like which have already been installed. Preferably, the thickness of the sleeves is such that a distance of minimally 6 mm casu quo maximally 10 mm is maintained between thin casu quo thick cables, tubes or the like.

Another embodiment of a system according to the invention is characterized in that at least two sleeves can be provided around the at least one cable, tube or the like in spaced-apart relationship, leaving open an intermediate space in the opening/the frame. As a result of the presence of this intermediate space, which is filled with air, a high heat insulation is obtained.

Another embodiment of a system according to the invention is characterized in that said system is provided with fire resisting filling means, whereby first the fire resisting means is to be provided around the at least one cable, tube or the like to be passed and whereby subsequently said filling means can be provided in at least part of the remaining space in the opening/the frame. Preferably, the fire resisting filling means is substantially formed in the shape of a sleeve, all this corresponding with the sleeve of the fire resisting means. That which has been said before with reference to the specific rubber properties in a preferred embodiment of the fire resisting means, now also applies to the fire resisting filling means. An important advantage of the use of sleeves as the fire resisting filling means is that there is sufficient inclusion of air in the opening/the frame, so that a high degree of heat insulation is obtained. Preferably, the system includes a marking means, for example, in the shape of rubber bars, which can be provided in the sleeves acting as filling means, so that said bars project beyond the opening/the frame during operation and thus indicate which sleeves are still available for any cables to be passed therethrough.

Another embodiment of a system according to the invention is characterized in that said system includes a heat resisting and/or liquid repellent material which, after the fire resisting means—and possibly the fire resisting filling means—have been provided, can be sealingly provided at at least one open side of the opening. The presence of this heat resisting and/or liquid repellent material increases the liquid- and gastightness of the system.

Another important aspect of the invention is as follows. Numerous occasions have shown that, in case a building is on fire, fire rapidly propagates along openings in walls of the building, such as along ventilating shafts thereof. Obviously, this is a highly negative phenomenon, in view of efforts to save lives, important items in the building and the building itself. It is an object of the invention to provide a solution to this problem. Therefore, a fire resisting system and method for preventing fire to propagate along an opening in a wall (for example a ventilating shaft) is proposed, characterized in that the system and method includes fire resisting means, preferably substantially formed in the form of (a) sleeve(s), which can at least partially be provided in said opening.

BRIEF DESCRIPTION OF THE DRAWINGS

The invention will be further explained with reference to figures illustrated in a drawing, wherein.

DESCRIPTION OF THE PREFERRED EMBODIMENTS

Figure 1:
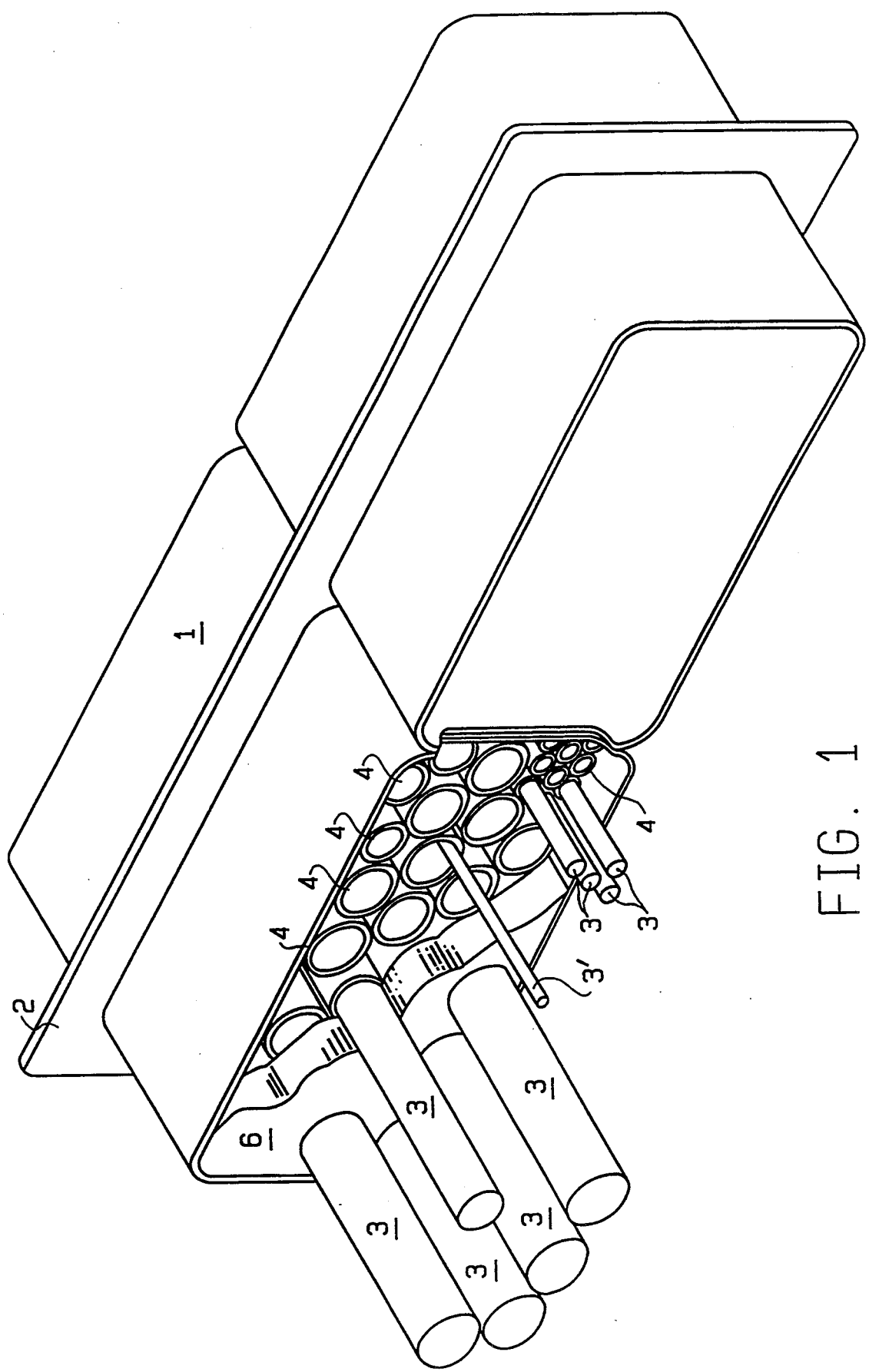
FIG. 1 is a perspective view of one embodiment of a system according to the invention.

In FIG. 1 a frame 1 can be distinguished, which is mounted in an opening provided in a steel deck or bulkhead of a ship. The frame 1 includes a supporting flange 2 located in the plane of the steel deck.

Figure 3:
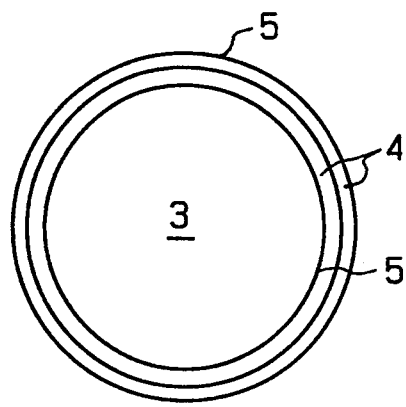
FIG. 3 shows a diagrammatic cross-section of a cable, tube or the like, around which two sleeves are provided.

After the frame 1 has been sealingly mounted in the opening, electric lines 3 are drawn through the frame 1. Then a sleeve 4 of a fire resisting rubber is provided around each electric line 3. This can be done all the more easily because the sleeves 4 are provided with a continuous slot 5 (FIG. 3). Subsequently, the remaining space in the frame 1 is filled with likewise sleeves 4 of the same fire resisting rubber. Finally, a fire resisting and/or liquid repellent material 6 is provided on either open side of the frame 1. Said material 6 has been selected to have good bonding properties, so that it will vulcanize, in conjunction with the air humidity, into a rubbery material within 24 hours. Possibly the outer surface of the heat resisting and/or liquid repellent material 6 can be smoothed with a wet knife. The presence of the heat resisting and/or liquid repellent material 6 guarantees a liquid- and gastight passage of the electric lines 3. It is because after its application the heat resisting and/or liquid-repellent material 6 is present in the sleeves 4 (functioning as filling means) and between the sleeves 4 (which are provided around the lines 3), a very stable entity having a high bonding capacity is obtained. It is noted that in FIG. 1 the heat resisting and/or liquid repellent material 6 has been partly left out, and that the right-hand opening in the frame 1 is shown to be empty, so as not to render FIG. 1 unnecessarily complicated. Also, a marking means in the form of a removable rubber bar 3' is shown extending through one of the empty sleeves 4 to show that this sleeve is still available for use. It is understood that each of the empty sleeves 4 can be provided with such marking means.

Figure 2:
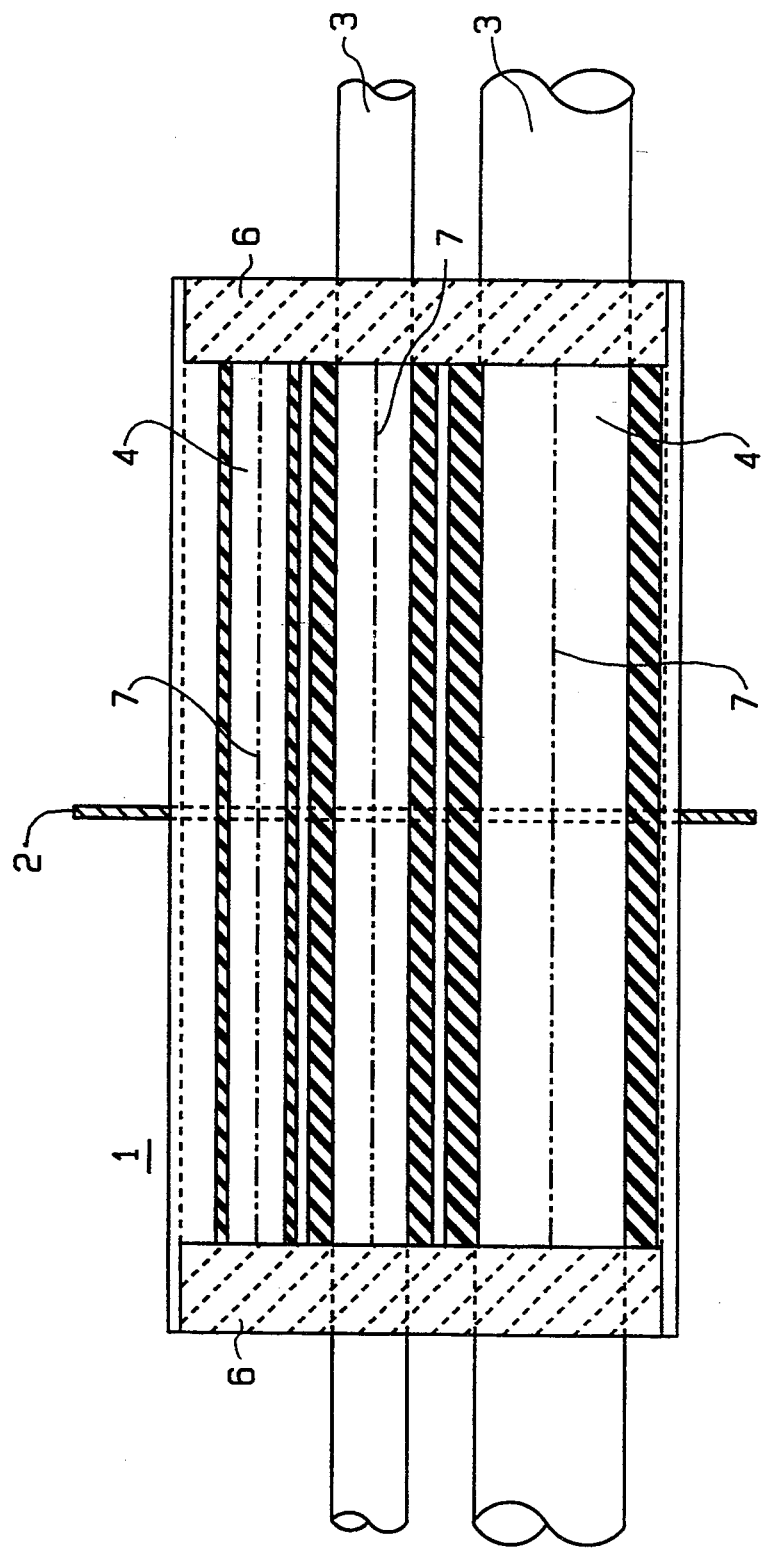
FIG. 2 shows a diagrammatic cross-section of the system shown in FIG. 1.

In FIG. 2 those parts that correspond with the parts of FIG. 1 have been given the same numerals. It is noted that the central axes of the sleeves 4 are indicated at 7. The uppermost sleeve 4 (helps to) fill(s) the space above the electric cables 3 in the frame 1.

FIG. 3 shows a diagrammatic cross-section of a tube 3, around which two rubber sleeves 4 having continuous slots 5 are provided.

Figure 4:
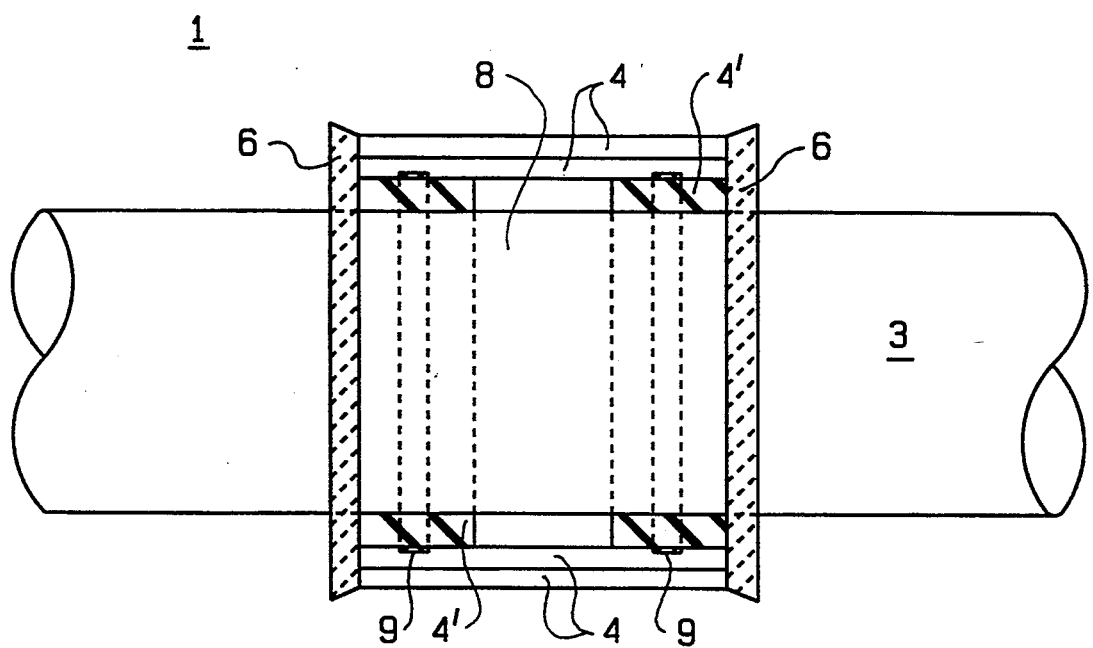
FIG. 4 shows a diagrammatic longitudinal section of another embodiment of a system according to the invention.

In FIG. 4 another embodiment of a system according to the invention can be distinguished, wherein two rubber sleeves 4' are provided around an electric cable 3 in spaced-apart relationship, leaving open an air-insulated space 8. Iron strips 9 are provided so as to function as reinforcing means and to keep the sleeves 4' together. In the remaining space sleeves 4 are provided, in the manner already described herein, and a heat resisting and/or water repellent material 6 is provided.

Figure 5:
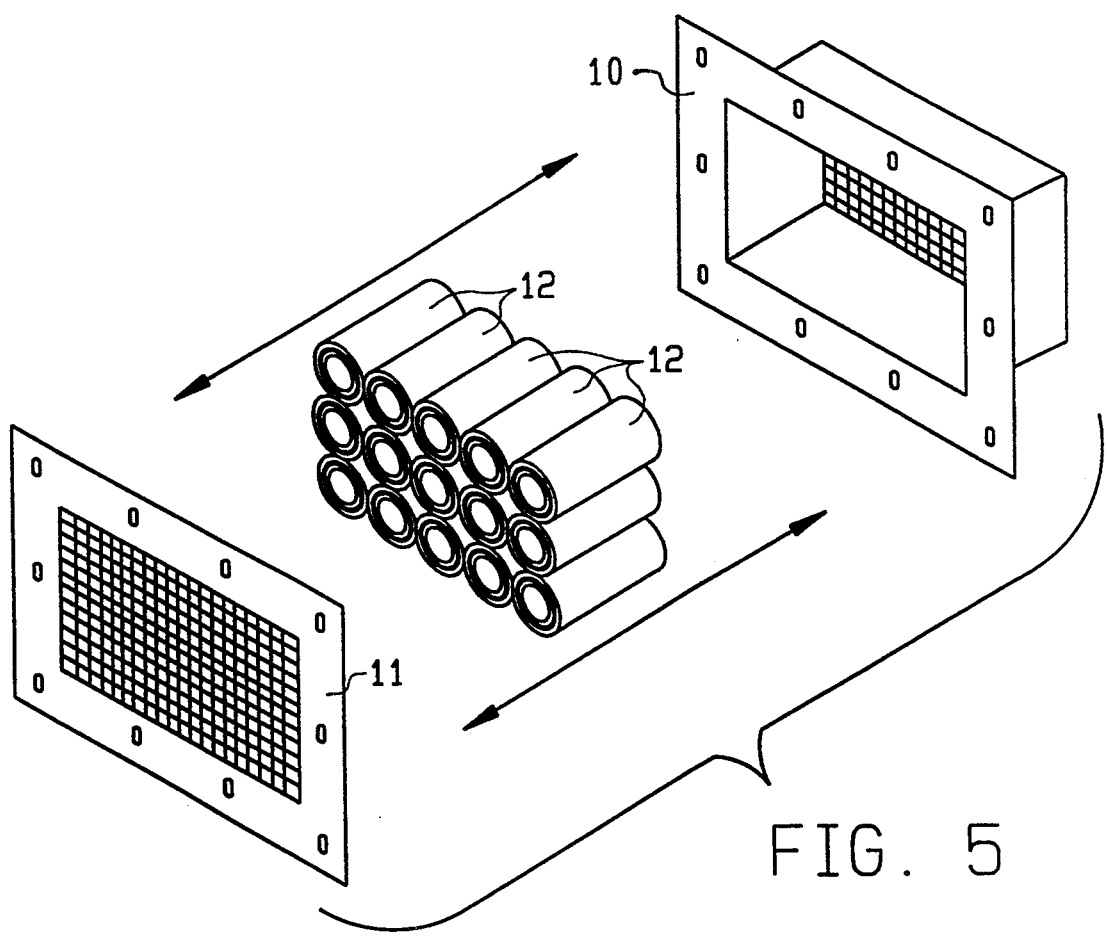
FIG. 5 shows a perspective, partially exploded view of another embodiment of a system according to the invention.
Figure 6:
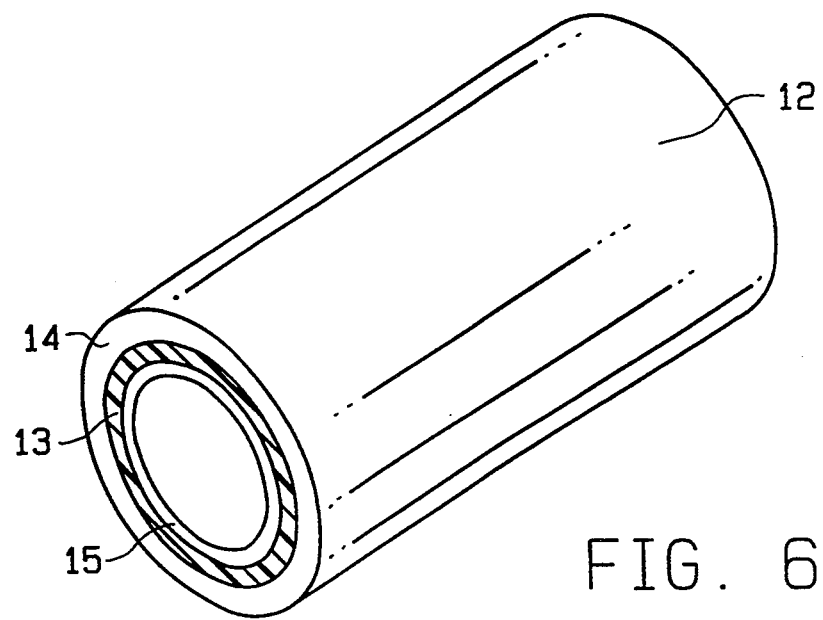
FIG. 6 shows a perspective view of a sleeve in FIG. 5.

In FIG. 5 another embodiment of a system according to the invention can be distinguished, wherein a frame 10 of a fire safe ventilation duct to be fixed against a wall, a front plate 11 of the fire safe ventilation duct to be fixed on top of a flange of the frame 10, and sleeves 12 of a fire resisting rubber (removable for cleaning from time to time) are shown. A sleeve 12 comprises a PVC-insert 13 (thickness 3.2 mm), a fire resistant rubber 14 expanding halogen free (thickness 5 mm), and a fire resistant rubber 15 expanding halogen free (thickness 4 mm) with a lower expanding rate with respect to rubber 14 (FIG. 6).

In case of fire, the rubber 15 inside the ventilation sleeve 12 will expand by the flow of hot air through the opening of the sleeves 12 thereby closing off the ventilation opening of the fire safe ventilation duct. As soon as the temperature increases further, rubber 14 at the outside of the ventilation sleeves 12 will squeeze the PVC-inserts 13. The wire mesh at both sides of the frame 10 prevents the expanding rubber mass to escape. The rubber creates in this way a solid mass of rubber and plastic (hardens directly after squeezing due to the superb insulation properties of the expanded rubber), which offers excellent mechanical stability during the fire.

Figure 7:
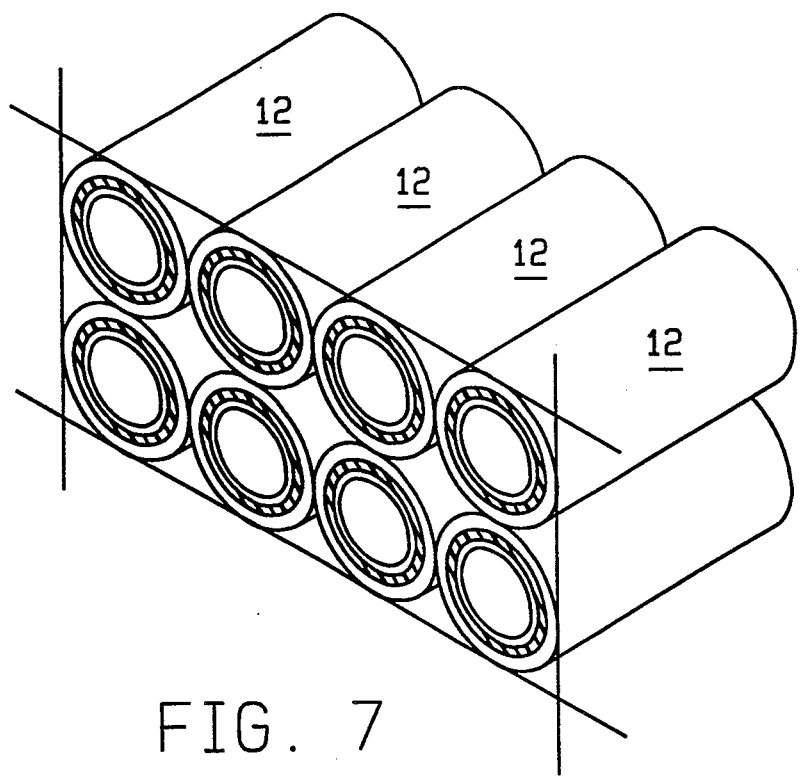
FIG. 7 a modified duct assembly for sleeves such as in FIG. 6.
Figure 8:
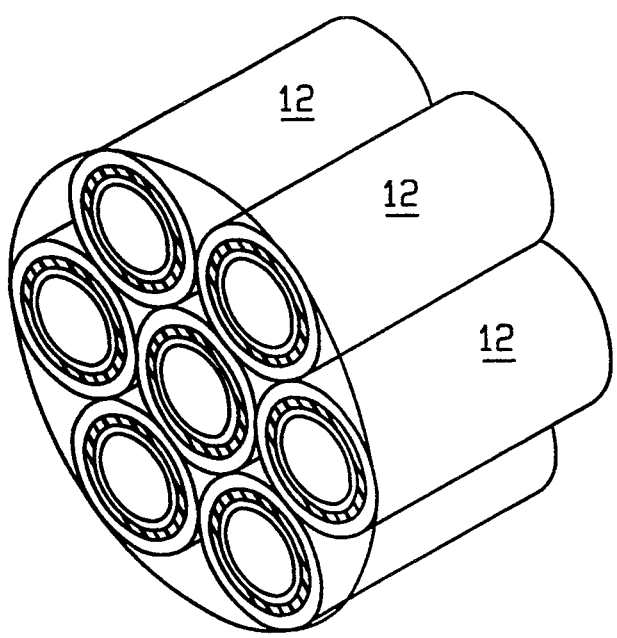
FIG. 8 shows another duct embodiment for sleeves such as in FIG. 6.

FIG. 7 shows several duct assemblies for sleeves 12 for square/rectangular or round frames, respectively.

I claim:

1. A fire resisting system comprising a wall with an opening in the wall, at least one elongated member extending through said opening in a liquid ad gastight manner, and fire resisting means at least partially disposed in said opening and at least partially disposed around one of said at least one member, said fire resisting means being substantially formed in the shape of a first sleeve means placed around said at least one member, and said system further includes fire resisting filling means defined by at least one additional sleeve means, empty of any elongated members, positioned in at least part of the remaining space in the opening and extending side by side with said first sleeve mans of the fire resisting means.

2. A system according to claim 1, wherein said system includes a frame for sealingly mounting in the opening in the wall, characterized in that said fire resisting means is disposed at least partially within said frame and at least partially around said at least one member passed through said opening.

3. A system according to claim 2, characterized in that at least two axially spaced sleeves are positioned around the at least one member in axial spaced apart relationship, leaving open an intermediate space in the opening and the frame.

4. A system according to claim 3 characterized in that two additional sleeves are positioned around said two axially spaced sleeves in circumferentially surrounding relation to and bridging said intermediate space defined between said two axially spaced sleeves.

5. A system according to claim 4 characterized in that said two axially spaced sleeves are positioned in circumferential engagement with said at least one member at axially spaced locations therealong.

6. A system according to claim 1, characterized in that said system includes marking means in said at least one additional sleeve means of the fire resisting filling means which is empty of any of said members.

7. A system according to claim 1, characterized in that said system further includes a heat resisting and/or liquid repellent material positioned at at least one open side of the opening.

8. A fire resistant system comprising a wall unit with an opening in the wall unit; and fire resisting means including a plurality of sleeve means, each said sleeve means extending substantially through said opening and each having a longitudinal axis, wherein the longitudinal axes of said plurality of sleeve means are spaced apart and in side by side relation to one another; said sleeve means being constituted of material which expands upon heating due to fire to cause said material to expand and close off the sleeve means and opening against the passage of air and fire.

9. A system according to claim 8 characterized in that said opening extends through said wall and includes a wire mesh at both sides of the walls covering said opening, said wire mesh being of a size to prevent said sleeve means from expanding out of said opening when heated due to fire.

10. A system according to one of claims 8 and 9 characterized in that each of said sleeve means includes a first sleeve member, a second sleeve member of heat expandable material disposed internally of said first sleeve member and a third sleeve member of heat expandable material disposed externally on said first sleeve member, said second and third sleeve members being constituted of material which expands upon heating due to fire to cause said second and third sleeve members to expand and fill any empty space in said opening.

11. A system according to claim 10 characterized in that said second and third sleeve members are constituted of a fire resistant rubber which expands free of halogen, with said second sleeve member having a lower expanding rate with respect to said third sleeve member.

12. A fire resisting system comprising:
a) a wall having an opening extending therethrough and at least one cable extending through said opening;
b) first fire resisting sleeve means defined by a separate sleeve disposed around each cable and extending at least partially in said opening; and
c) a plurality of additional sleeve means, defined by at least one additional sleeve, empty of any cables, extending in the same direction as the first mentioned sleeve means and filling any remaining space in said opening and extending side by side with said first mentioned sleeve means.

13. A system according to claim 12, further including a fire resisting material disposed in and around all of said sleeve means and filling any spaces on at least one side of said opening not taken up by said sleeve means and cables to provide a liquid and gastight passage of said cables through said opening.

14. A system according to claim 12 wherein at least some of said first mentioned sleeve means include a first sleeve member, a second sleeve member of heat expandable material disposed internally of said first sleeve member, and a third sleeve member of heat expandable material disposed externally on said first sleeve member, said second and third sleeve members being constituted of material which expands upon heating due to fire to cause said second and third sleeve members to expand and fill any empty space in said opening.

15. A system according to either one of claims 12 and 13 wherein each of the sleeve means is constituted of material which expands upon heating due to fire to cause said sleeve means to expand and fill any empty spaces in said opening.

16. A method for passing at least one cable trough an opening in a wall in a liquid and gastight manner comprising the steps of:
a) passing said cables through said opening;
b) placing first heat resisting sleeve means over the portion of each of said cables disposed in said opening; and
c) filling any remaining space in said opening not taken up by said cables and said first sleeve means with additional heat resisting sleeve means, empty of any cables, extending in the same direction as and side by side with the first sleeve means.

17. The method according to claim 16 further comprising the step of:
(a) filling any remaining spaces in and around each of said sleeve means and cables on at least one side of said opening with a fire resisting material to provide a liquid and gastight passage of said cables through said opening.

18. The method according to either of claim 16 and 15 wherein each of said sleeve means is constituted of material which expands upon heating due to fire to case said sleeve mans to expand and fill any empty spaces in said opening.

* * * * *